US008960601B2

(12) United States Patent
Willdig et al.

(10) Patent No.: US 8,960,601 B2
(45) Date of Patent: Feb. 24, 2015

(54) AIRCRAFT COOLING DUCT

(75) Inventors: Victor John Willdig, Wiltshire (GB); Kim Sharp, South Gloucestershire (GB)

(73) Assignee: Airbus Operations Limited, Bristol (GB)

( * ) Notice: Subject to any disclaimer, the term of this patent is extended or adjusted under 35 U.S.C. 154(b) by 1625 days.

(21) Appl. No.: 12/093,157

(22) PCT Filed: Nov. 7, 2006

(86) PCT No.: PCT/GB2006/004151
§ 371 (c)(1), (2), (4) Date: May 9, 2008

(87) PCT Pub. No.: WO2007/057638
PCT Pub. Date: May 24, 2007

(65) Prior Publication Data
US 2008/0277526 A1    Nov. 13, 2008

(30) Foreign Application Priority Data
Nov. 18, 2005    (GB) .................................. 0523570.0

(51) Int. Cl.
B64C 1/38 (2006.01)
(52) U.S. Cl.
USPC .................................................... 244/117 A
(58) Field of Classification Search
USPC ................. 244/117 A, 58, 57, 53 B
See application file for complete search history.

(56) References Cited

U.S. PATENT DOCUMENTS

| 1,682,204 | A | | 8/1928 | Wait, Jr. | |
|---|---|---|---|---|---|
| 1,730,978 | A | * | 10/1929 | Lepere | 244/57 |
| 1,970,565 | A | * | 8/1934 | Kean | 244/57 |
| 2,164,545 | A | * | 7/1939 | Rogers | 244/57 |
| 2,352,144 | A | * | 6/1944 | Woods | 244/204 |
| 2,365,223 | A | * | 12/1944 | Silverstein et al. | 244/53 R |
| 2,441,279 | A | * | 5/1948 | McCollum | 165/41 |
| 2,721,715 | A | * | 10/1955 | Hoadley | 244/130 |
| 2,742,247 | A | * | 4/1956 | Lachmann | 244/130 |
| 3,129,910 | A | * | 4/1964 | Smith | 244/107 |
| 3,246,469 | A | * | 4/1966 | Moore | 60/265 |
| 3,467,348 | A | * | 9/1969 | Lemelson | 244/130 |
| 3,516,895 | A | | 6/1970 | Hartman | |
| 3,794,274 | A | * | 2/1974 | Eknes | 244/130 |
| 4,121,606 | A | * | 10/1978 | Holland et al. | 137/15.1 |

(Continued)

FOREIGN PATENT DOCUMENTS

GB    2235662 A    3/1991

OTHER PUBLICATIONS

ISR for PCT/GB2006/004151 dated Mar. 9, 2007.

(Continued)

Primary Examiner — Tien Dinh
(74) Attorney, Agent, or Firm — Lowe Hauptman & Ham, LLP

(57) ABSTRACT

An aircraft structure, for example a wing, includes a section of skin, for example a lower wing panel, the panel defining an external (lower) surface that in use is on the exterior of the aircraft and an internal (upper) surface opposite the external surface, and a duct comprising a section of duct for transporting cooling fluid, for example air, between the internal and external surfaces of the panel from a first location in the panel to a second location that is spaced apart from the first location in a direction substantially parallel to the external surface of the panel. The cooling air cools an electronic hydrostatic actuator (EHA 4b) in the wing 2.

15 Claims, 8 Drawing Sheets

(56) References Cited

U.S. PATENT DOCUMENTS

| | | | | |
|---|---|---|---|---|
| 4,418,708 A | * | 12/1983 | Schulze et al. | 137/15.2 |
| 4,674,704 A | * | 6/1987 | Altoz et al. | 244/1 R |
| 4,962,903 A | * | 10/1990 | Byron | 244/117 A |
| 5,263,667 A | * | 11/1993 | Horstman | 244/209 |
| 5,655,359 A | * | 8/1997 | Campbell et al. | 60/772 |
| 5,772,156 A | * | 6/1998 | Parikh et al. | 244/209 |
| 6,082,669 A | * | 7/2000 | Bardagi et al. | 244/53 B |
| 6,247,668 B1 | * | 6/2001 | Reysa et al. | 244/58 |
| 6,349,899 B1 | * | 2/2002 | Ralston | 244/53 B |
| 6,772,976 B1 | * | 8/2004 | Rouse et al. | 244/1 R |
| 7,014,145 B2 | * | 3/2006 | Bagnall | 244/53 B |
| 7,048,230 B2 | * | 5/2006 | Meyer | 244/130 |
| 2006/0102781 A1 | * | 5/2006 | Hein et al. | 244/58 |
| 2013/0248657 A1 | * | 9/2013 | Riordan | 244/53 B |

OTHER PUBLICATIONS

British Search Report for GB0523570.0 dated Mar. 10, 2006.

* cited by examiner

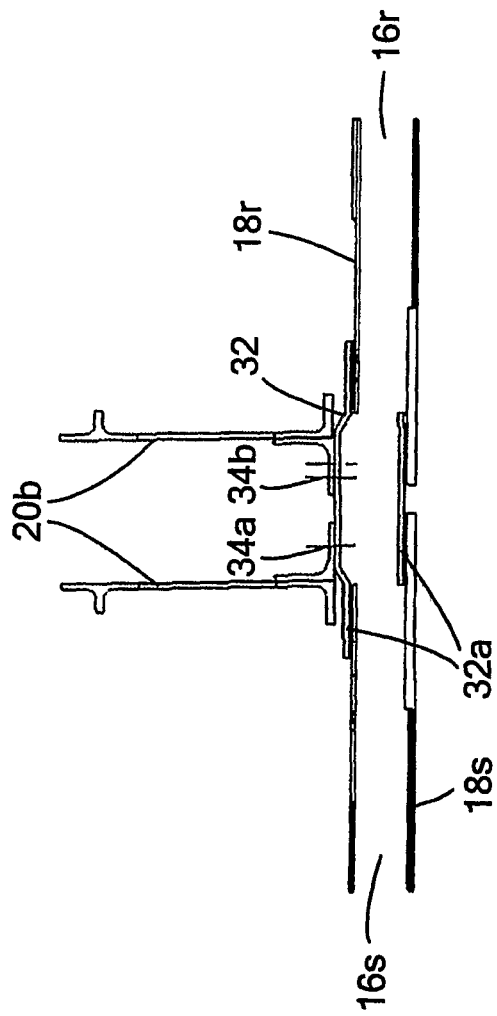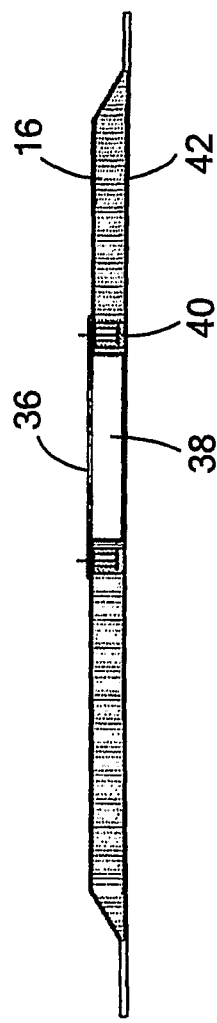

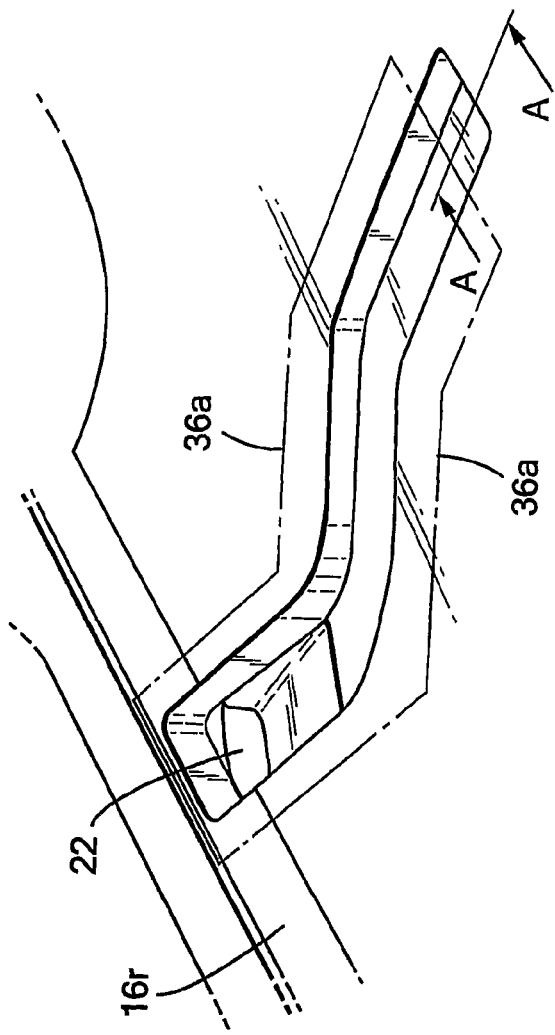
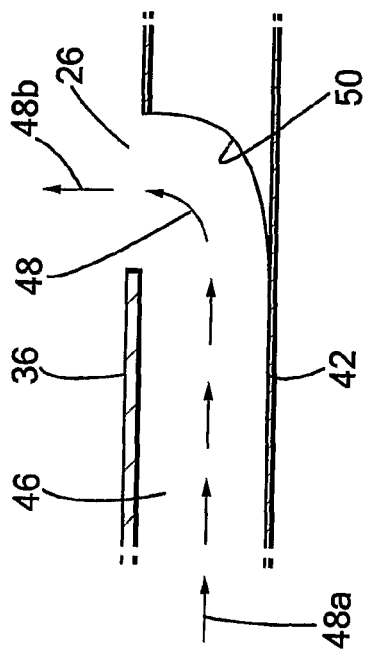

AIRCRAFT COOLING DUCT

RELATED APPLICATIONS

The present application is based on International Application Number PCT/GB2006/004151 filed Nov. 7, 2006, and claims priority from British Application Number 0523570.0 filed Nov. 18, 2005, the disclosures of which are hereby incorporated by reference herein in their entirety.

TECHNICAL FIELD

The present invention relates to a duct for transporting cooling fluid to a region to be cooled in an aircraft.

BACKGROUND OF THE INVENTION

Certain items of aircraft equipment, for example electronic actuators, may in use require cooling. Cooling of such equipment may be effected by means of transporting cooling fluid to the equipment by means of a duct. In the case where the item of equipment is bulky, as may be the case when the equipment is an electrically powered hydraulic actuator for controlling ailerons or spoilers on a wing, the free space available for a duct may be limited. Some of the factors, insofar as incorporating such a cooling duct is concerned, that need to be taken into account when designing an aircraft structure will now be described. Preferably, such ducts are placed in a location such that maintenance and/or removal of other components in the aircraft can be performed without needing to perform a separate step of moving or removing the duct or a part thereof. Preferably, such ducts are predominantly straight, will avoid sudden changes of direction, or contain at most one or two turns, otherwise the effective flow of cooling fluid can be impaired. Preferably, the duct is rigid. Preferably, if the duct is fed with air from the exterior of the aircraft via an air inlet, such an air inlet should be outside of any designated fire zones. Preferably, when designing the shape and dimensions of an aircraft structure, the need to supply a cooling fluid duct should not have any significant effect on the design. It would for example be extremely disadvantageous for the volume of an aircraft structure to be increased during the design process simply to accommodate a cooling fluid duct. For example, it is preferred for any ducting to be contained within the volume of the aircraft structure as designed without taking into account the need to accommodate such ducting. Preferably, the flow of cooling fluid into and along the duct is effected without the need for additional pumps, fans or the like. Preferably, the mass and length of the duct should be kept as low as is reasonably practical. Preferably, in the case where the duct is to be located in an area of a wing, which may be congested with existing systems, the cooling duct should be positioned so as there is no disruption or re-routing of such systems. There are therefore many factors that need to be taken into account when designing an aircraft structure that includes a cooling fluid duct. Conventional ducts may in certain circumstances be difficult to incorporate into the design of an aircraft structure whilst taking into account the design factors mentioned above. It will of course be appreciated that in many cases, including the present invention, the above factors to be taken into account are optional and one or more factors may be given less weight than others, or even be ignored, in relation to a particular design.

SUMMARY OF THE INVENTION

The present invention provides an aircraft structure including a section of skin, the skin defining an external surface that in use is on the exterior of the aircraft and an internal surface opposite the external surface, and a duct comprising a section of duct for transporting cooling fluid between the internal and external surfaces of the skin from a first location in the wing skin to a second location that is spaced apart from the first location in a direction substantially parallel to the external surface of the skin.

Thus, the present invention provides an arrangement of a duct in an aircraft structure that enables the design of an aircraft structure, at least insofar as the provision of cooling fluid ducts is concerned, to be improved or eased in comparison to the ducts of the prior art that are provided substantially wholly within the interior volume of the wing defined by the internal surface of the wing skin.

The duct of the present invention may have one or more of the preferred features mentioned in the introduction preceding the above statement of invention.

The section of duct is advantageously so shaped and configured that the section of duct extends substantially parallel to the external surface of the skin. It will of course be understood that the first location need not be separated from the external surface by the same distance as the separation of the second location from the external surface.

The section of duct preferably has a length greater than its width or depth. The section of duct preferably has a length greater than three times the greatest of its width and depth. The section of duct preferably has a minimum width of greater than 50 mm. The section of duct preferably has a minimum height of greater than 10 mm.

The section of skin may include a cooling fluid inlet that is in fluid communication with the duct. The cooling fluid may be in the form of air taken from the exterior of the aircraft. Such a cooling fluid inlet may be arranged on the external surface of the skin. The cooling fluid inlet may be configurable to a closed position in which the inlet is closed. The cooling fluid inlet may be configurable to an open position in which the inlet is open. The cooling fluid inlet may be in the form of an air scoop, or NACA duct.

The duct may include an inlet that is positioned remotely from an outlet of the duct. The inlet is advantageously positioned outside of a region designated as a fire zone.

The aircraft structure may include an air scoop configurable to a first position in which, during flight of the aircraft, it extends into airflow exterior of the aircraft structure so that air is admitted into the duct via the air scoop. The air scoop may be configurable to a second position in which, during flight of the aircraft, air is prevented from being admitted into the duct via the air scoop. The air scoop may comprise a flap or other structure that enables the air scoop to be switched between its first and second configurations. The air scoop may be arranged to be movable from its first position to its second position. The air scoop may be so arranged that in its second position it is substantially flush with the external surface of the skin.

The section of skin may include a cooling fluid outlet in fluid communication with the duct. The cooling fluid outlet may be arranged on the internal surface of the skin.

In an embodiment of the invention, the duct links an inlet on the external surface of the skin and an outlet on the internal surface of the skin. In that embodiment, the outlet of the duct is arranged next to an item of equipment to be cooled. One inlet may feed a plurality of outlets.

The duct may form part of a cooling system that transports cooling fluid around a cooling loop. In such a case the cooling fluid may comprise air, or may be a coolant comprising gases and/or liquids other than air.

The section of duct may be integrally formed with the section of skin. The section of duct may be defined by the shape of the skin. In such a case, the skin may be monolithic in its construction in the region of the section of duct. Alternatively, the section of duct may be separate and distinct from the surrounding skin structure. The section of duct may define, at least in part, one of the internal surface and the external surface of the skin. The section of duct may include a removably mounted wall. The removably mounted wall may define, at least in part, one of the internal surface and the external surface of the skin. The wall may for example be in the form of a capping plate.

The section of duct is advantageously wholly contained within the bounds of the notional envelope defined by the external and internal surfaces of the skin. The external and internal surfaces may in such a case be defined by the structure of the duct. For example, the external and internal surfaces in the region of the duct may be coincident with or contained by the notional envelope of the skin defined by the external and internal surfaces of the skin in regions adjacent to, but outside of, the region of the duct. It will of course be understood that the duct need not be wholly contained within the bounds of the external surface and the internal surface of the skin. For example, the duct may include not just the section of duct, which may be located between the internal and external surfaces of the skin, but also another length of ducting that protrudes or passes outside of the envelope defined by the internal and external surfaces of the skin.

The average thickness of the section of duct is conveniently greater than 50% of the average thickness of skin in the region of the section of duct. The thickness of the duct may therefore be significant in relation to the thickness of the skin. The average thickness of the skin in the region of the section of duct is conveniently less than 150% of the average thickness of the skin excluding the region of skin comprising the duct. Thus, the thickness of the skin (the separation of the internal and the external surface of the skin) need not be much greater in the region of the duct than in a region remote from the duct.

The section of skin may be defined by a single panel of skin. Alternatively, the section of skin may be defined by more than one panel of skin. In the case where the section of skin is defined by two or more panels, the duct may be arranged to transport cooling fluid from one panel to another adjacent panel. In such a case, the section of duct may include a joint in the region of the join between two adjacent panels.

The duct may have a cross-section which is substantially rectangular in shape. The duct may have a cross-section which channels air-flow. For example, the duct may have a plurality of notional channels through which cooling fluid is directed to flow. At least one wall of the duct may have a cross-section which is substantially corrugated in shape.

The aircraft structure may include an item of equipment that in use requires cooling. The item of equipment may be in the form of an electronic actuator, for example an electronic hydrostatic actuator (or EHA). The section of skin including the section of duct is advantageously arranged to transport cooling fluid to the item of equipment. For example, the section of skin may be arranged to transport air to the item of equipment from the exterior of the aircraft.

The aircraft structure may define at least part of a wing. In such a case, the section of skin may be in the form of one or more wing panels.

The section of skin may be made from metal. Alternatively, the section of skin may be made from composite material.

The present invention also provides an aircraft including an aircraft structure including a section of skin, the skin defining an external surface that in use is on the exterior of the aircraft and an internal surface opposite the external surface, and a duct comprising a section of duct for transporting cooling fluid between the internal and external surfaces of the skin from a first location in the wing skin to a second location that is spaced apart from the first location in a direction substantially parallel to the external surface of the skin. The aircraft structure of the aircraft may incorporate any of the features of the aircraft structure of the invention as described herein.

The present invention also provides a section of aircraft skin including a section of duct, the section of aircraft skin being configured so as to be suitable for use as the section of aircraft skin of the aircraft structure according to any aspect of the aircraft structure of the invention as described herein.

The present invention further provides a method of cooling equipment inside an aircraft including transporting cooling fluid to the equipment to be cooled, the cooling fluid being transported between the internal and external surfaces of a section of skin from a first location in the skin to a second location that is spaced apart from the first location in a direction substantially parallel to the external surface of the skin. The method of cooling may incorporate aspects of the structure or other features of the aircraft structure according to the invention as described herein. For example, the cooling fluid may be air, for example drawn from the exterior of the aircraft. Also, the method may include a step of providing or using an aircraft structure according to any aspect of the invention as described herein. The method may be performed during the use of back-up EHA equipment to cool such EHA equipment. The method may be performed in the wing of the aircraft.

DESCRIPTION OF THE DRAWINGS

Embodiments of the present invention will now be described by way of example with reference to the attached drawings of which:

FIG. 7 is a cross-sectional view of the duct joint of FIG. 6 when in situ, FIG. 8 is a sectional view of a duct according to a second embodiment of the invention, FIG. 9 shows a perspective view of a section of bellows duct as used in a third embodiment of the present invention, FIG. 10*a* is a perspective view of a panel including integrated ducting in accordance with a fourth embodiment of the invention, FIG. 10*b* shows a schematic cross-section of section A-A of FIG. 10*a*.

DETAILED DESCRIPTION

Figure 1:
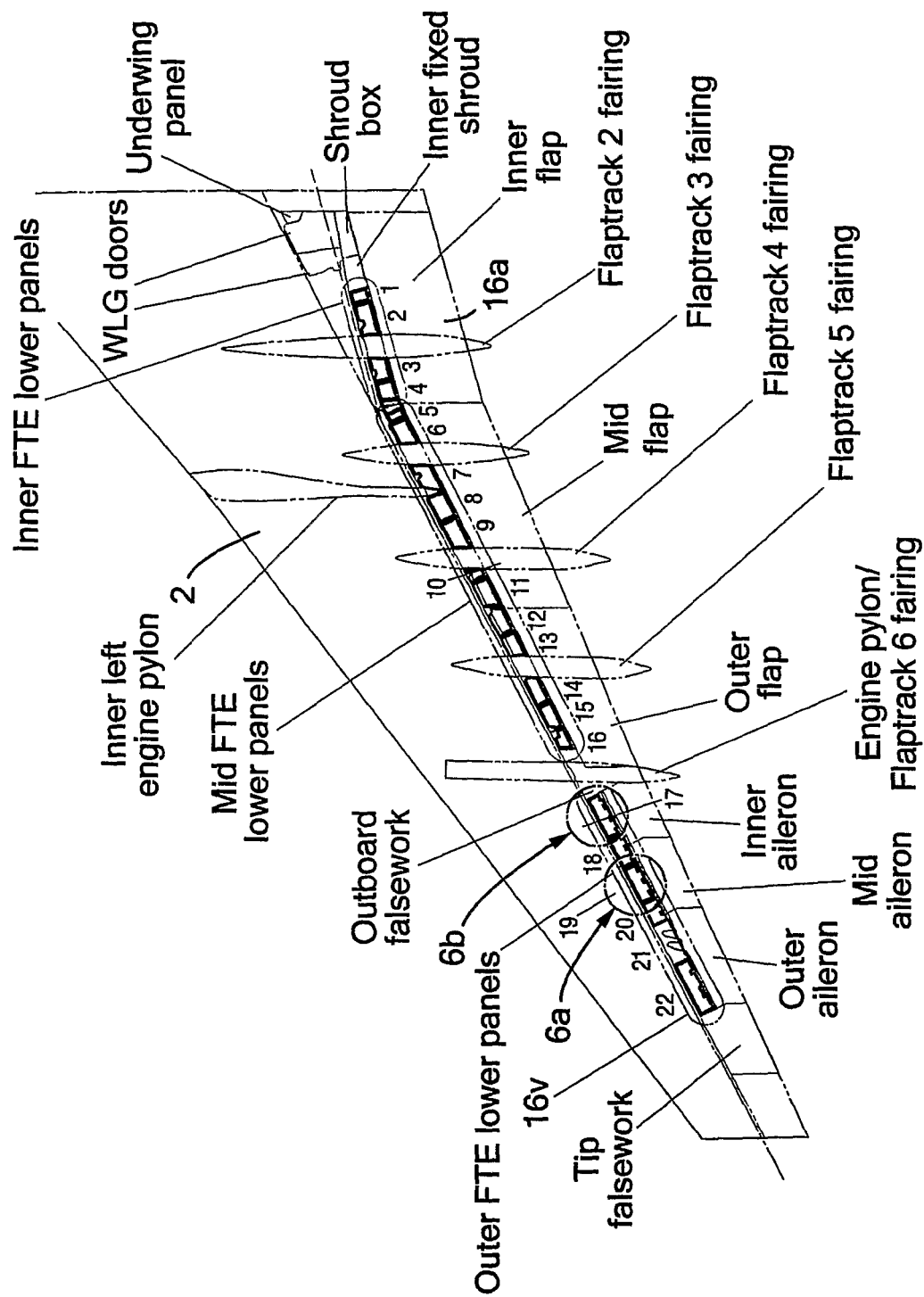
FIG. 1 is a plan view of a wing according to a first embodiment of the invention showing the positions of two electronic hydraulic actuators.

There is a trend in the design of modern commercial aircraft for at least some the flight control hydraulic systems to be replaced by electronic systems. FIG. 1 shows a wing 2 of a large passenger aircraft, which has two hydraulic systems and one electronic system, as opposed to three hydraulic systems as commonly used in other aircraft. The wing 2 of FIG. 1 therefore houses hydraulically powered flight control systems that are powered by one of the hydraulic systems of the aircraft and also electrically powered flight control systems that are powered by the electronic system of the aircraft. The wing 2 includes two electrically powered flight control actuators in the form of two EHAs (Electronic Hydrostatic Actuators). A first EHA 4a (not shown in FIG. 1) is positioned in the wing 2 at a first position 6a for actuating the mid aileron of the wing in the event that the hydraulically powered actuator provided to actuate the mid aileron fails. Similarly, and with reference to FIGS. 1 and 2, a second EHA 4b is positioned in the wing 2 at a second position 6b to serve as a backup actuator for actuating the inner aileron of the wing in the event that the hydraulically powered actuator 8 fails. The EHA 4b includes an electronically powered hydraulic system including an electrically powered hydraulic pump 10 that provides the hydraulic power for driving the hydraulic actuator 12 of the EHA 4b. The EHA 4b is therefore relatively large in size in comparison to the volume of the wing 2. The EHA 4b is bounded by a shear-web rib 20c on either side with a clearance of approximately 10 mm and by an upper and lower composite honeycomb wing skin panel 16 above and below, also with a clearance of approximately 10 mm.

Figure 2:
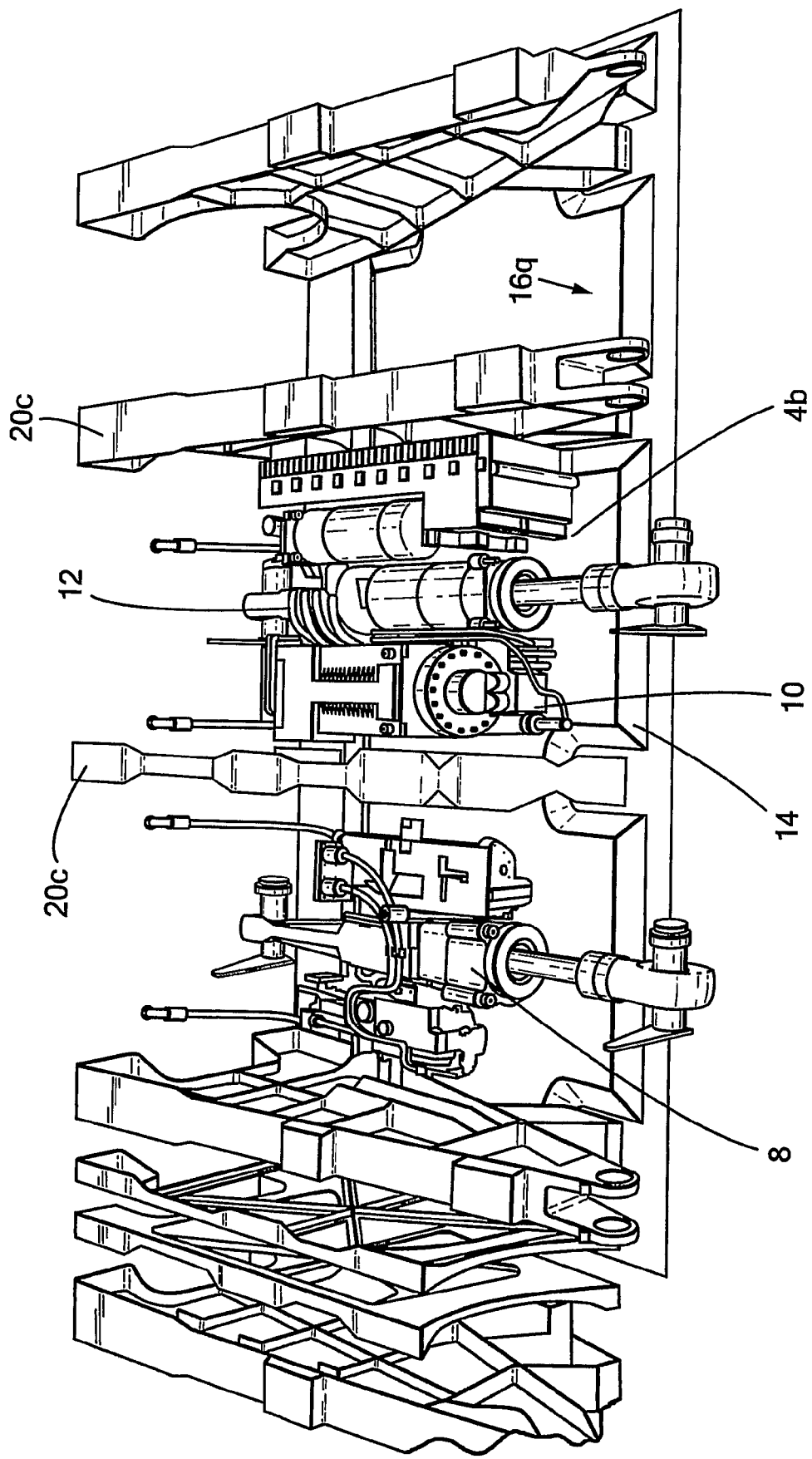
FIG. 2 is a perspective view inside the wing of FIG. 1 showing one of the electronic hydraulic actuators next to a conventional primary hydraulic actuator.

As a result of the introduction of such EHAs it can be the case that due to their relatively large size they can fill a significant proportion of the available volume within the trailing edge of the wing where they are positioned. As a result of the combination of the limited volume available in the wing and the heat generated by the EHAs during use, the temperature of the actuator would, if not adequately controlled, rise as a result of the heat being unable to dissipate effectively into the ambient air. Thus, according to a first embodiment of the invention there is provided a cooling system for cooling the EHA 4b so that its temperature does not exceed operational limits. The cooling is effected locally by directing cooling airflow onto the electronic actuator at an area 14 at the aft end of the EHA 4b. A cooling air duct (not shown in FIG. 1 or 2) is arranged to transport air from the exterior of the aircraft to the EHA 4b, at least a section of the duct being provided within the lower wing skin. The panels 16a-v that form the lower wing skin of the wing 2 of FIG. 1 are numbered from one to twenty-two, panel one 16a being the panel closest to the wing root and panel twenty two 16v being closest to the wing tip. The actuators shown in FIG. 2, are positioned in the region of panel seventeen 16q. Some of the lower panels of the wing 2 thus include an integrally formed cooling air duct.

Figure 3:
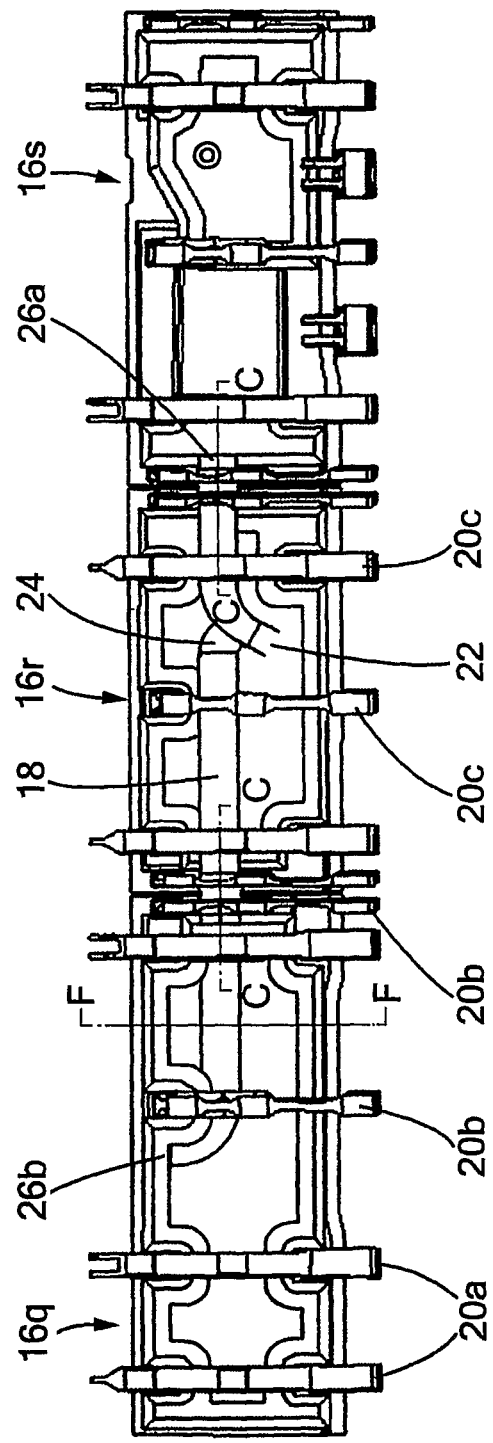
FIG. 3 is a plan view of three lower panels of the aircraft wing of FIG. 1, the panels including a duct.
Figure 4:
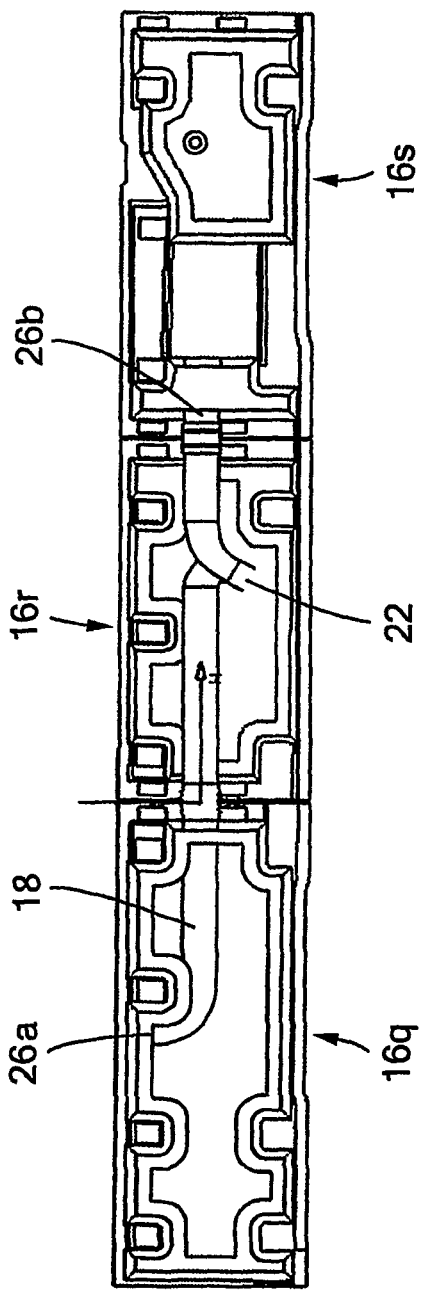
FIG. 4 is the same view as shown in FIG. 3 with the ribs having been removed for the sake of clarity.

FIGS. 3 and 4 show in plan view the arrangement of the cooling duct 18 in the lower panels 16q-s (panels seventeen to nineteen) with the actuators and other equipment removed for the sake of clarity. The orientation of the views shown are such that the top of each of the drawings of FIGS. 3 and 4 is at the aft end of the panels whereas the bottom of each drawing is at the forward end. FIG. 3 shows the arrangement of ribs 20 in the wing 2 including hinge ribs 20a and panel support ribs 20b. FIG. 4 shows the same view as FIG. 3, but with the ribs removed for the sake of clarity. An inlet 22 to the cooling duct is provided in panel eighteen 16r of the lower wing skin on the exterior (lower) surface. The inlet 22 feeds, via a diffuser 24, two respective sections of duct 18, which allows cooling air to be fed to two outlets 26a, 26b on the interior (upper) surface of the panels (panels seventeen 16q and nineteen 16s) adjacent to panel eighteen 16r. The outlets 26a, 26b, provided in the form of simple slot-shaped apertures, are positioned in close proximity to the area of the EHAs to be cooled. The sections of duct 18 are in the form of a closed channels running between the inlet 22 and the respective outlets 26. The inlet 22 is mounted remote from the inner aileron actuator, because the inner aileron actuator lies within the outer engine fire zone of the aircraft (this fire zone extending inwardly from panel seventeen 16q, which is partially in the fire zone). If the inlet were instead provided in this fire zone there would be a risk of ingress of flame into the trailing edge of the wing in the event of an outer engine fire. The inlet 22 is therefore positioned in panel eighteen 16r and outside of the fire zone.

Figure 5:
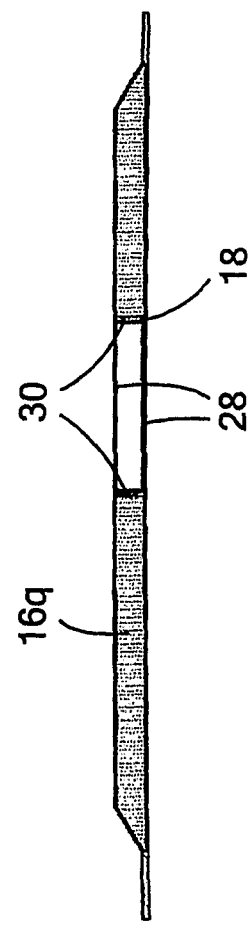
FIG. 5 is a cross-sectional view of the duct of the first embodiment.

FIG. 5 shows a cross-section of panel seventeen 16q along the section F-F as shown in FIG. 3. The panel is of a honeycomb sandwich construction having a thickness of about 20 mm. As can be seen in FIG. 5, the duct 18 has a thickness approximately equal to the thickness of the wing skin panel 16q. The closed rectangular section duct 18 is made of fibre reinforced polymer (or any other suitably strong and light material) and is integrated in the panel 16q during manufacture by means of film adhesive 28 at the top and bottom and foaming adhesive 30 at the sides. The panel 16q is otherwise manufactured in a conventional way.

Figure 6:
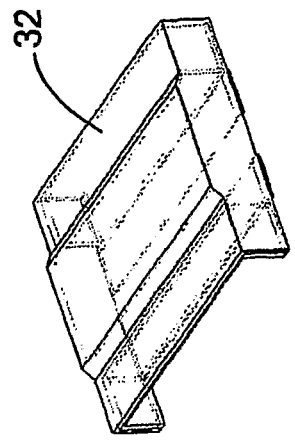
FIG. 6 is a perspective view of a duct joint used for joining two ducts in respective adjacent panels according to the first embodiment of the invention.

FIGS. 6 and 7 illustrate a join between the section of duct 18r in panel eighteen 16r and the section of duct 18s in panel nineteen 16s. FIG. 6 is a perspective view of a bridging duct 32 for effecting the duct joint between the two duct sections 18r, 18s. FIG. 7 is a cross-section of the wing panels along the section C-C as shown in FIG. 3. The bridging duct 32 is attached to a split panel support rib 20b by means of a rigid attachment 34a and a sliding attachment 34b (to allow for sliding movement and to accommodate manufacturing tolerances). The walls 32a of the bridging duct 32 are provided with a sealing surface comprising expanded neoprene with a PTFE external surface to provide a sliding seal between the bridging duct 32 and the adjacent section of duct 18. The flexible seal of the joint between the two adjacent panels 16s, 16v is thus able to accommodate relative movement between the panels caused by wing bending, tolerances and temperature effects.

In use, when a hydraulically powered actuator (for the inner aileron or the mid aileron) fails, the back-up EHA takes over actuation of the aileron. To avoid overheating, the EHA is cooled by means of cooling air transported from the exterior of the aircraft to the EHA via the cooling duct that is integrated in the wing skin.

Thus, localised cooling is directed to the EHA, despite the space constraints caused by the size of the actuators, and despite difficulties associated with the position of the electrical and hydraulic systems of the aircraft, and the position on the actuator that is required to be cooled. The integration of the ducting into the wing skin has advantages over the provision of separate conventional ducting to perform the cooling. For example, conventional ducting would, owing to the space constraints and the positions of various components in the wing including the positions of the actuators, need to have a relatively tortuous path and consequently there would be air pressure losses incurred along the length of the duct as a result of the twists and turns in the path of the duct. Also, ducting inlets and associated conventional ducting mounted below the inner aileron actuator to direct airflow onto the actuator would, as mentioned above, be unsuitable because the inner aileron actuator lies within the outer engine fire zone of the aircraft. Also, an existing area that is considered as structure is used as a conduit for airflow which, as a result of the lower wing skin panels spanning across the wing and covering the entire width of the wing from the ailerons to the rear spar, has the consequence that there is a continuous run of structure that is available to duct through. As there is no need to run ducting outside the panel envelope, the electrical and hydraulic systems in the wings in the region of the spars are unaffected by the duct routing.

With reference to FIG. 8, a second embodiment of the invention is provided which is similar to the first embodiment except that the duct is formed in the wing skin 16 by means of an open channel in the panel 16 that is closed by means of a removeable capping plate 36. The panel 16 is of the conventional honeycomb sandwich construction, but includes a U-shaped duct 38 made of carbon fibre reinforced polymer that is moulded into the panel 16 during its manufacture together with fastener receptacles 40 that receive fasteners, in the form of bolts, for securing the capping plate 36 in position. In FIG. 8, the lower skin (outside surface) is labelled with the reference numeral 42. The capping plate 36 includes an aperture that defines the outlet 26 of the duct. The use of an upper capping plate 36 thus allows flexibility to alter the outlet position to achieve an optimum position and/or shape, without the need to change a complete wing skin panel. This is particularly advantageous during flight test programmes. Alternatively, the capping plate may be positioned on the outside surface.

FIG. 9 shows in perspective view a section of duct 44 according to a third embodiment having a generally rectangular cross-section, but also having a bellows-like shape in cross-section. The duct 44 is thus formed by means of upper and lower corrugated surfaces that form the bellows-like shape, thereby forming notional channels for the flow of air along the duct 44. The duct, in a similar manner to the first embodiment, is integrally formed in the wing skin panel. A section of corrugated duct like that shown in FIG. 9 may be used to form a joint in a similar manner to that shown in FIGS. 6 and 7.

Figure 11:
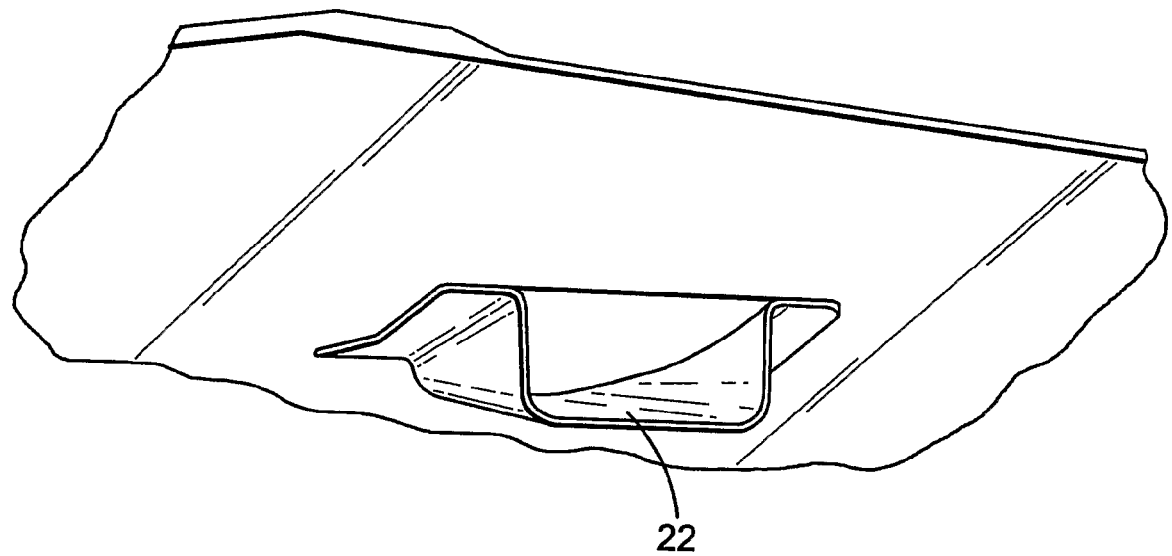
FIG. 11 shows an inlet scoop of the integrated ducting of FIG. 10*a*, and FIGS. 12a and 12b show a schematic side view of an automatic scoop inlet for use with ducting according to a fifth embodiment of the invention.

A fourth embodiment of the invention is shown in FIGS. 10a, 10b and 11. The fourth embodiment is very similar to the second embodiment in that the duct 46 includes a removable capping plate 36, but differs in that the inlet 22 feeds only one outlet 26. Also, the inlet 22, outlet 26 and the duct 46 are all contained within a single wing panel 16r and there is therefore no need for a joint between adjacent ducts. FIG. 10a is a perspective view of a duct 46 in panel eighteen 16r showing the single duct 46 with its capping plate 36 removed, the shape of the coverplate being shown by means of the outline 36a. FIG. 10b shows a cross-section of the wing panel, including the duct with the capping plate in place, along the section A-A of the wing shown in FIG. 10a. The inlet 22 is in the form of a fixed position air scoop. The scoop is shown in perspective view in FIG. 11 and has a cross-section of rectangular shape which at its widest measures 80 mm×40 mm. The scoop has a 10 degree slope relative to the lower (outside) wing skin surface. The outlet 26 of the duct 46 is defined by a region of the duct 46 that is left uncovered by the capping plate 36 (i.e. the capping plate 36 does not have an aperture formed therein for the purpose of defining the shape of the outlet). FIG. 10b shows that, in the region of the outlet 26, the panel has a curved corner surface 50 providing a smooth transition for the airflow (represented in FIG. 10b by arrows 48) from (a) the flow in the direction 48a parallel to the lower surface 42 of the panel to (b) the flow out of the duct 46 in a transverse direction 48b.

Figure 12A:
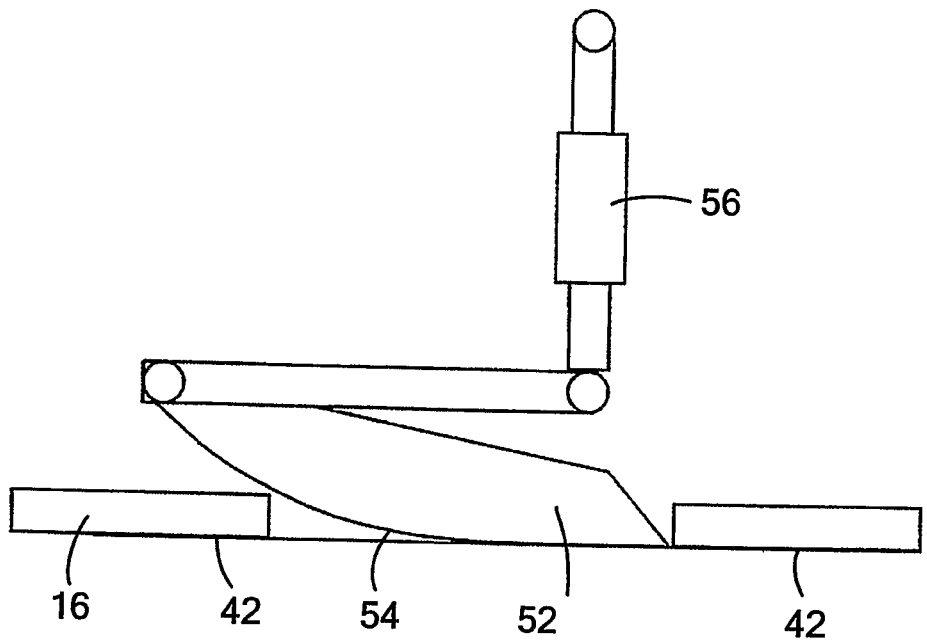
Figure 12B:
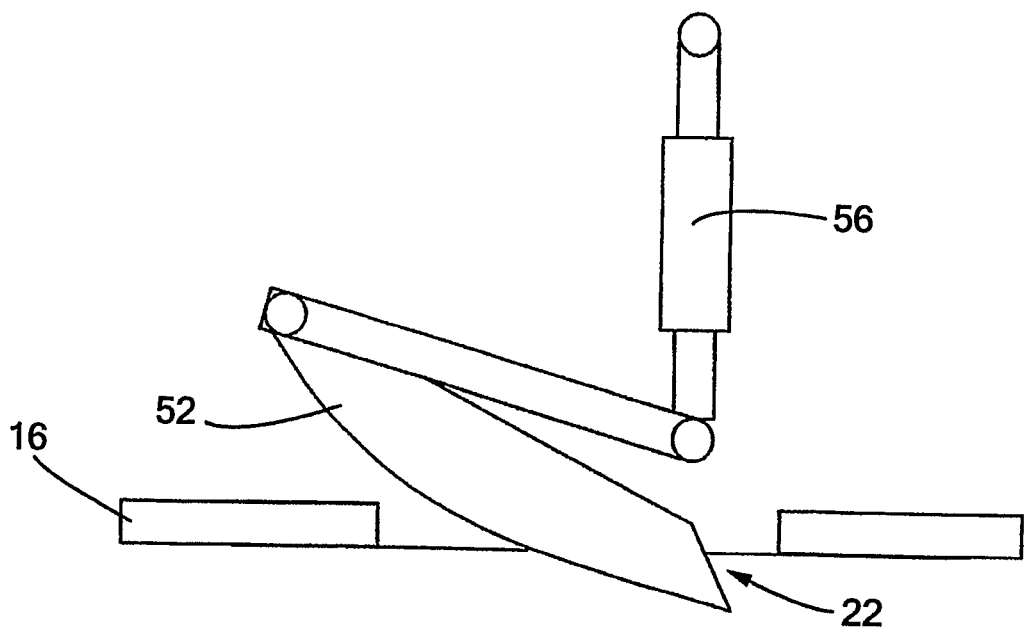

A fifth embodiment of the invention is illustrated by FIGS. 12a and 12b, which show schematically in cross-section a movable air scoop 52 in a closed position and an open position respectively. In its open position, the scoop 52 provides the inlet 22 for a duct integrated into the lower wing skin panel 16 of an aircraft, which is similar in configuration to the duct of the fourth embodiment. In the closed position (FIG. 12a) the scoop 52 covers over the inlet 22 and its lower surface 54 is substantially flush (although, not completely flush) with the lower surface 42 of the panel 16. When cooling air is required, air is admitted via the inlet 22 into the duct by opening the inlet 22. The inlet 22 is opened by means of moving the scoop 52 into the airflow to the exterior of the aircraft. Air is thereby admitted, via the inlet 22, into the scoop 52 and then flows into the duct 18 (not shown). The scoop is moved by means of an actuator 56, that may be (but need not be) thermally actuated. The disadvantage of the drag caused by means of the provision of an air scoop in the airflow over the lower surface of the wing may therefore be avoided when the cooling is not required. It will of course be appreciated that FIGS. 12a and 12b are schematic in nature and that the scoop in its closed position could be more flush with the external/lower surface of the panel than is shown in the Figures.

Whilst the present invention has been described and illustrated with reference to particular embodiments, it will be appreciated by those of ordinary skill in the art that the invention lends itself to many different variations not specifically illustrated herein. By way of example, certain variations to the above-described embodiments will now be described.

Above it is stated that in an embodiment of the invention the outlet of the ducting is in the form of a single slot. The outlet could of course take other forms and may for example be defined by a circular hole, or by multiple holes or slots, which could be positioned along the length of the ducting. The type, shape and number of outlet geometries that can be used may of course be dependant upon the cooling flow required.

The thickness of the duct may be slightly greater than the thickness of the wing skin panel either side of the duct.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft structure including a lower skin and an upper skin, comprising:

a section of lower skin, the lower skin defining an external surface that in use is on the exterior of the aircraft and an internal surface directly opposite the external surface, and wherein the section of lower skin is defined by one or more panels, a duct comprising a section of duct defined by a region between the internal and the external surfaces of the lower skin, said section of duct transporting cooling fluid along said region from a first location in the lower skin to a second location that is spaced apart from the first location in a direction substantially parallel to the external surface of the lower skin, wherein the section of lower skin includes a cooling fluid inlet arranged on the external surface of the lower skin, the cooling fluid inlet being in fluid communication with the duct, wherein said section of lower skin includes a cooling fluid outlet arranged on the internal surface of the lower skin, the cooling fluid outlet being in fluid communication with an inlet of the section of duct, and an item of aircraft equipment that in use requires cooling being positioned and configured in fluid or thermal communication with an outlet of the section of duct.

2. An aircraft structure according to claim 1, wherein the cooling fluid inlet is configurable to (i) a closed position in which the inlet is closed, and (ii) an open position in which the inlet is open.

3. An aircraft structure according to claim 1, wherein the aircraft structure includes an air scoop configurable to a first position in which, during flight of the aircraft, the air scoop extends into airflow exterior of the aircraft structure so that air is admitted into the duct via the air scoop and a second position in which, during flight of the aircraft, the air scoop is substantially flush with the external surface of the skin and air is prevented from being admitted into the duct via the air scoop.

4. An aircraft structure according to claim 1, wherein the section of skin includes a cooling fluid outlet in fluid communication with the duct, the cooling fluid outlet being arranged on the internal surface of the skin.

5. An aircraft structure according to claim 1, wherein the section of duct is integrally formed with the section of lower skin.

6. An aircraft structure according to claim 1, wherein the section of duct includes a removably mounted wall that defines, at least in part, one of the internal surface and the external surface of the lower skin.

7. An aircraft structure according to claim 1, wherein the section of lower skin is defined by two or more panels and the duct is arranged to transport cooling fluid from one panel to another adjacent panel.

8. An aircraft structure according to claim 7, wherein the section of duct includes a joint in the region of the join between two adjacent panels.

9. An aircraft structure according to claim 1, wherein at least one wall of the duct has a cross-section which is substantially corrugated in shape.

10. An aircraft structure according to claim 1, wherein the structure defines at least part of a wing.

11. An aircraft including an aircraft structure according to claim 1.

12. A section of aircraft skin including a section of duct, the section of aircraft skin being configured so as to be suitable for use as the section of aircraft skin of the aircraft structure according to claim 1.

13. An aircraft structure including a lower skin and an upper skin, comprising a section of lower skin, the section of lower skin defining an external surface that in use is on the exterior of the aircraft and an internal surface opposite the external surface, and wherein the section of lower skin is defined by one or more panels, a duct comprising a section of duct for transporting cooling fluid between the internal and external surfaces of the section of lower skin from a first location in the wing skin to a second location that is spaced apart from the first location in a direction substantially parallel to the external surface of the section lower skin, wherein the aircraft structure includes an air scoop configurable to a first position in which, during flight of the aircraft, the air scoop extends into airflow exterior of the aircraft structure so that air is admitted into the duct via the air scoop and a second position in which, during flight of the aircraft, wherein a first portion of said air scoop is substantially flush with the external surface of the section of lower skin and a second portion of said air scoop is inwardly arcuate with the external surface of the section of lower skin and air is prevented from being admitted into the duct via the air scoop.

14. A method of cooling equipment inside an aircraft comprising an aircraft structure according to claim 1, the method including transporting cooling fluid to the equipment to be cooled, the cooling fluid being transported between the internal and external surfaces of the section of lower skin from a first location in the section of lower skin to a second location that is spaced apart from the first location in a direction substantially parallel to the external surface of the section of lower skin.

15. A method according to claim 14, wherein the method is performed during the use of back-up EHA equipment in a wing of an aircraft to cool such EHA equipment.

* * * * *